(12) United States Patent
Ferguson et al.

(10) Patent No.: US 10,521,549 B1
(45) Date of Patent: Dec. 31, 2019

(54) METHOD AND APPARATUS FOR PROVIDING POWER ESTIMATIONS FOR ELECTRONIC SYSTEM DESIGNS

(71) Applicant: BAE SYSTEMS INFORMATION AND ELECTRONIC SYSTEMS INTEGRATION INC., Nashua, NH (US)

(72) Inventors: Richard J. Ferguson, Bealeton, VA (US); Joseph R. Marshall, Jr., Manassas, VA (US); George A. Sawyer, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 9 days.

(21) Appl. No.: 16/123,775

(22) Filed: Sep. 6, 2018

(51) Int. Cl.
  *G11C 5/14* (2006.01)
  *G06F 17/50* (2006.01)
  *G06F 11/34* (2006.01)

(52) U.S. Cl.
  CPC ...... *G06F 17/5086* (2013.01); *G06F 11/3452* (2013.01); *G06F 17/5022* (2013.01); *G06F 2217/78* (2013.01)

(58) Field of Classification Search
  CPC ............. G06F 17/5086; G06F 11/3452; G06F 17/5022
  USPC ......................................................... 365/226
  See application file for complete search history.

(56) References Cited

U.S. PATENT DOCUMENTS

| | | | |
|---|---|---|---|
| 8,060,765 B1 * | 11/2011 | Cha ........................... | G06F 1/08 713/322 |
| 2014/0195178 A1 * | 7/2014 | Gatts ...................... | G06Q 50/06 702/61 |
| 2018/0121573 A1 * | 5/2018 | Chou .................... | G06F 17/504 |

* cited by examiner

*Primary Examiner* — Vu A Le
(74) *Attorney, Agent, or Firm* — Antony P. Ng; Russell Ng PLLC

(57) ABSTRACT

A method for providing a power estimation for an electronic system is disclosed. Initially, a system architecture of an electronic system design is initially developed, and the system architecture of the electronic system design is then converted to a power flow architecture of the electronic system design. For each power domain within the power flow architecture of the electronic system design, a power domain type is designated. Subsequently, power information are added to the power flow architecture of the electronic system. Finally, a power roll-up calculation is performed on the power flow architecture of the electronic system design in order to yield a final system power value for the electronic system design.

12 Claims, 8 Drawing Sheets

METHOD AND APPARATUS FOR PROVIDING POWER ESTIMATIONS FOR ELECTRONIC SYSTEM DESIGNS

STATEMENT OF GOVERNMENT INTEREST

This invention was made with government support under Contract No. 13-C-0007 awarded by OGA. The United States Government has certain rights in the invention.

TECHNICAL FIELD

The present disclosure relates to system power evaluations in general, and in particular to a method and apparatus to provide power estimations for electronic system designs.

BACKGROUND

When comes to modern electronic systems, high performance and low-power consumptions tend to be the two main considerations for designers. In many electronic system design environment, a system (or chip) architecture development team is responsible for designing a system architecture that allows for the highest performance of an electronic system (or chip), while a power analysis team is responsible for minimizing the power consumption of the electronic system.

Typically, the system architecture development effort happens separately from any power analysis effort. For example, the power analysis team will begin working on system power estimation only after a reasonable system architecture has been developed. Since there is usually no informational link between the source system architecture and the power information, a general disconnection commonly occurs between system architecture development and power analysis, and the disconnection can introduce opportunities for architecture translation errors and power information errors without any traceability or version control.

The present disclosure provides an improved method and apparatus for furnishing system power estimations for electronic system designs in order to serve as a bridge between system architecture development and power analysis.

SUMMARY

In accordance with one embodiment of the present disclosure, a system architecture of an electronic system design is initially developed, and the system architecture of the electronic system design is then converted to a power flow architecture of the electronic system design. For each power domain within the power flow architecture of the electronic system design, a power domain type is designated. Subsequently, power information is added to the power flow architecture of the electronic system. Finally, a power roll-up calculation is performed on the power flow architecture of the electronic system design in order to yield a final system power value for the electronic system design to compare to the system requirement.

The features and advantages described herein are not all-inclusive and, in particular, many additional features and advantages will be apparent to one of ordinary skill in the art in view of the drawings, specification and claims. Moreover, it should be noted that the language used in the specification has been selected principally for readability and instructional purposes and not to limit the scope of the inventive subject matter.

BRIEF DESCRIPTION OF THE DRAWINGS

The invention itself, as well as its modes of use, further objects, and advantages thereof, will best be understood by reference to the following detailed description of an illustrative embodiment when read in conjunction with the accompanying drawings, wherein.

DETAILED DESCRIPTION

Model-Based Systems Engineering (MBSE) is a methodology for developing and analyzing a system using graphical representations of the underlying functions, interfaces, relationships, requirements, parameters, behaviors, and architecture that define the system. By leveraging computing tools to structure, share and automatically analyze design information, MB SE overcomes the limitations of the conventional document-based approach. The goal of MBSE is to ensure specification completeness and consistency, traceability of requirements and design choices, reuse of design patterns and specifications, linkage to analysis and behaviors in specifications and functions, and a shared understanding of the designs among users and designers.

Modeling languages have been utilized to provide a consistent approach to MBSE requirements. One example of such modeling languages is the Systems Modeling Language (SysML). SysML allows for the usage of requirements diagrams to capture various requirements for a product or service, which includes requirements affecting function, performance, and interface.

SysML uses the concept of block as the basic unit structure to represent hardware, software, information, personnel, procedures, and facilities. A SysML requirements diagram identifies requirements hierarchies and derivations. A SysML parametric diagram identifies constraints on system property values such as performance, reliability and mass properties. It provides the ability to integrate the specification and design models with engineering analysis models.

A SysML behavior diagram includes SysML use case diagrams, SysML activity diagrams, SysML sequence diagrams, and SysML state machine diagrams. A SysML use case diagram is a high-level description of the functionality delivered through interactions between parts of a system. A SysML activity diagram illustrates the flow of data and control between activities. A SysML sequence diagram provides interactions between collaboration parts of the system. A SysML state machine diagram identifies transitions occurring in response to various events within the system.

Figure 1:
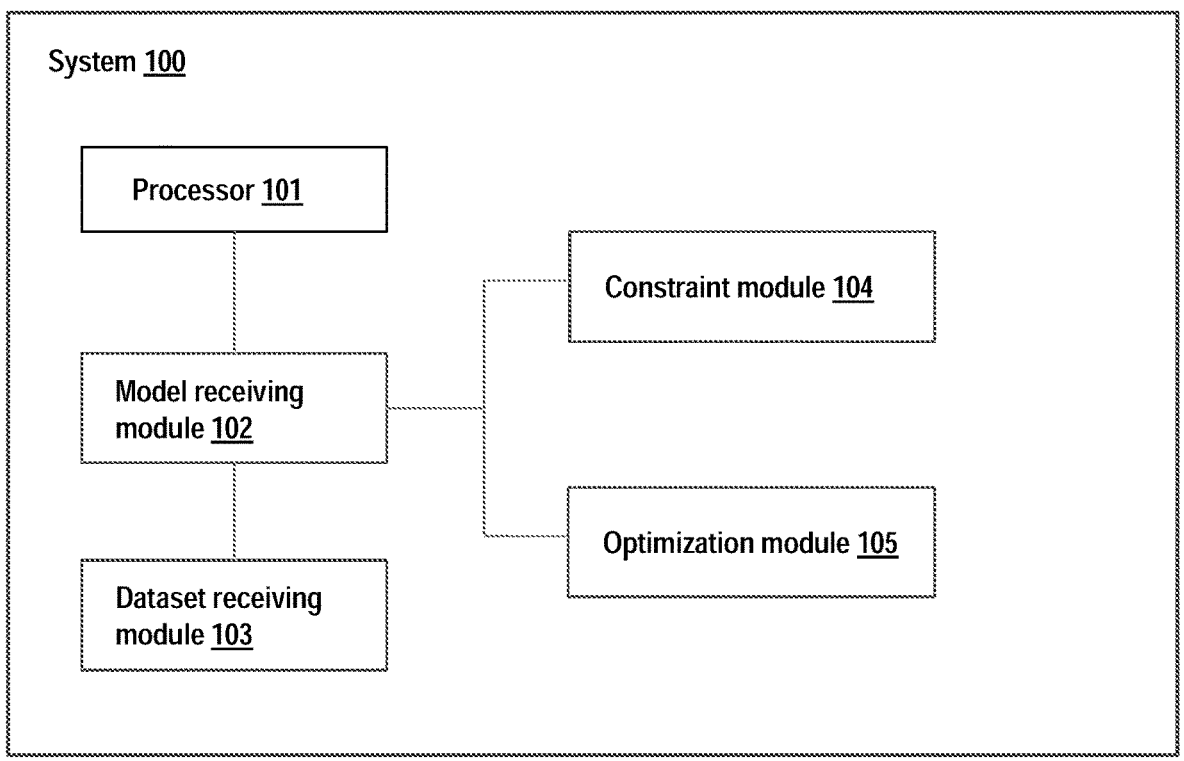
FIG. 1 is a block diagram of a data processing system capable of providing power estimations for electronic system designs, according to one embodiment.

Referring now to the drawings and in particular to FIG. 1, there is depicted a block diagram of a data processing system capable of providing power estimations for electronic system designs, according to one embodiment. As shown, a data processing system 100 includes a processor 101 and two input modules, namely, a model receiving module 102 and a dataset receiving module 103. Model receiving module 102 and dataset receiving module 103 can be a hardware device or software residing within a system memory. One modeling language employed by data processing system 100 can be, for example, SysML. Model receiving module 102 receives a model representing prototype objects and/or prototype connectors. Dataset receiving module 103 receives one or more datasets representing optional objects and/or optional alternative connectors. The separation between model receiving module 102 and dataset receiving module 103 allows graphically modeling of the generic, prototypic portions of the model, thereby generating a compact model.

Data processing system 100 also includes a constraint module 104 and an optimization module 105. Constraints over the prototype objects and/or the prototype connectors are defined by constraint module 104. The constraints may be utilized to reduce the space search of alternative designs used by optimization module 105. Optimization module 105 outputs optional alternative designs that are in accordance with the model of data processing system 100. Optimization module 105 utilizes processor 101 to identify optional alternative designs. Each optional alternative design has a set of optional objects and/or optional alternative connectors. The selected optional objects and/or optional alternative connectors are selected from the datasets received by dataset receiving module 103. The optional alternative designs output by optimization module 105 are in accordance with the model and its constraints.

Figure 2:
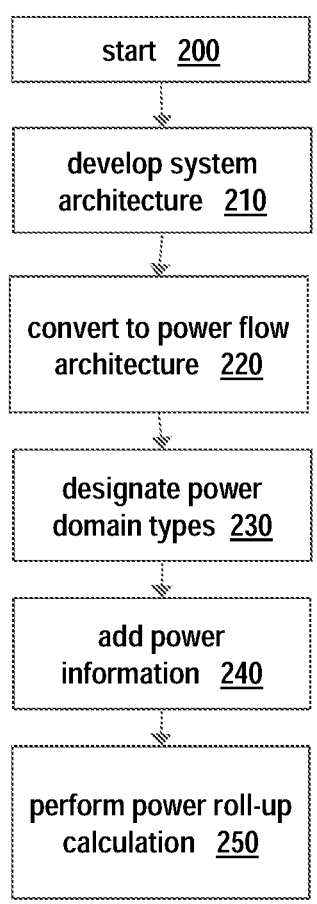
FIG. 2 is a logic flow diagram of a method for providing power estimations for electronic system designs, according to one embodiment.
Figure 3:
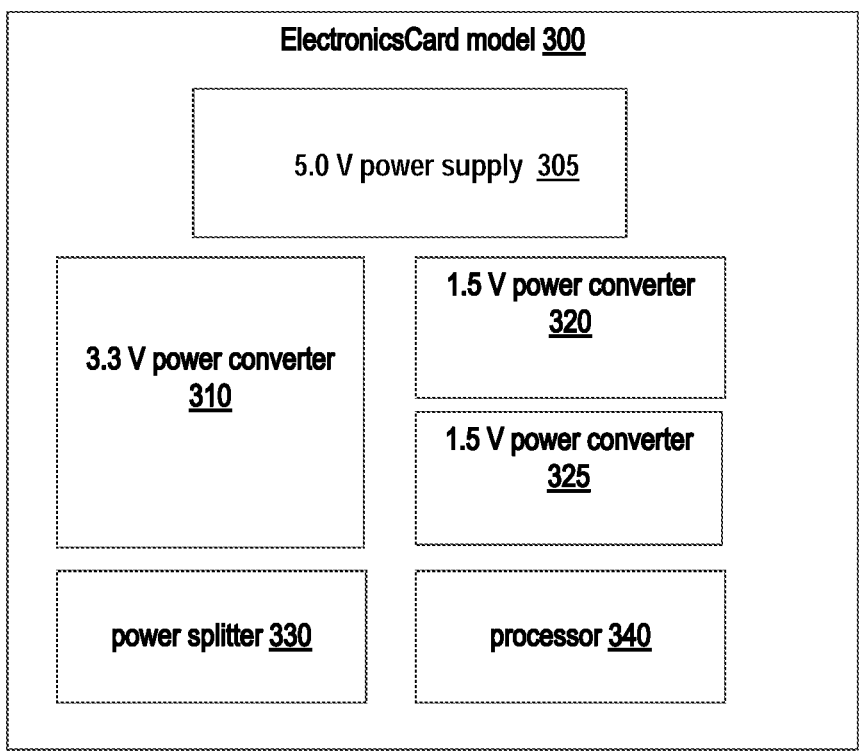
FIG. 3 shows a system architecture of an ElectronicsCard (or ElectronicsCardAssembly) model example, according to one embodiment.

With reference now to FIG. 2, there is depicted a logic flow diagram of a method to provide power estimations for an electronic system design, according to one embodiment. Starting at block 200, a system architecture of an electronic system design is developed, as shown in block 210. The system architecture of an electronic system design can be developed by a system architecture development team. For the purpose of illustration, the electronic system design is represented by an ElectronicsCard model 300 having one 5.0 V power supply, one 3.3 V power converter 310, two 1.5 V power converters 320, 325, one power splitter 330, and one processor 340, as shown in FIG. 3.

Next, the system architecture of the electronic system design is converted to a power flow architecture of the electronic system design, as depicted in block 220. The system architecture of the electronic system design can be converted to a power flow architecture of the electronic system design by a power analysis team. For the purpose of illustration, the power flow architecture of ElectronicsCard model 300 in FIG. 3 can be represented by a power flow diagram showing various power domains and their power relationship within ElectronicsCard model 300, as shown in FIG. 4A, or by a Venn diagram of various power domains within ElectronicsCard model 300, as shown in FIG. 4B.

Figure 4A:
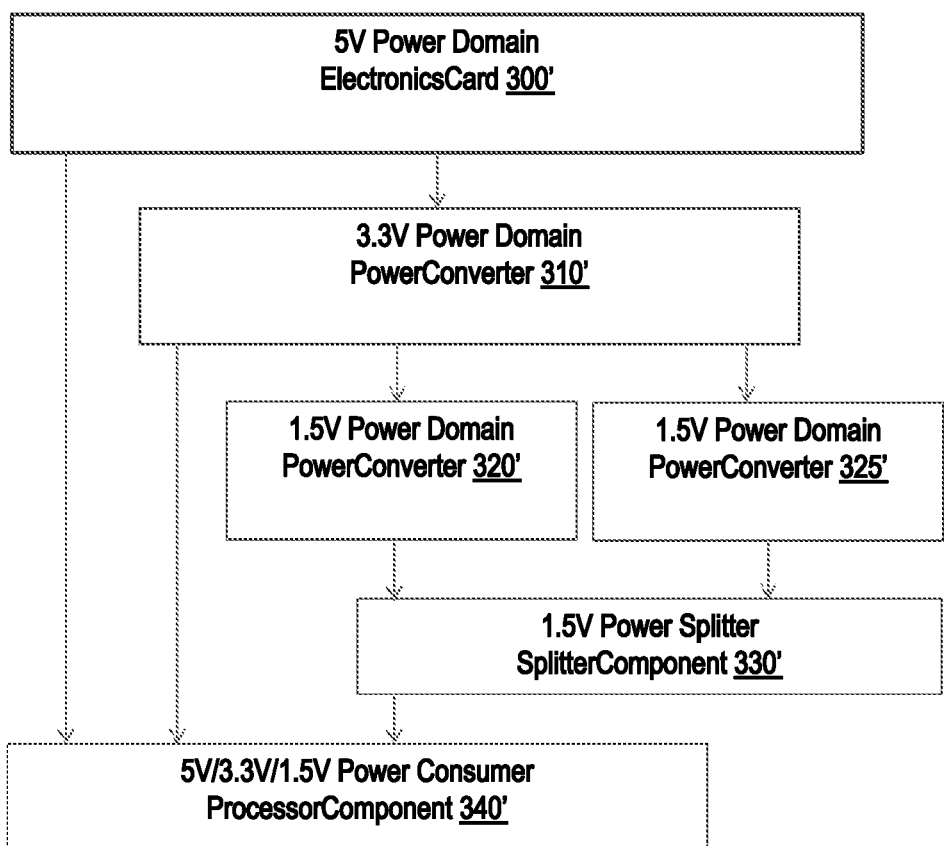
FIGS. 4A-4B show a power flow architecture of the ElectronicsCard model example from FIG. 3, according to two different embodiments.
Figure 4B:
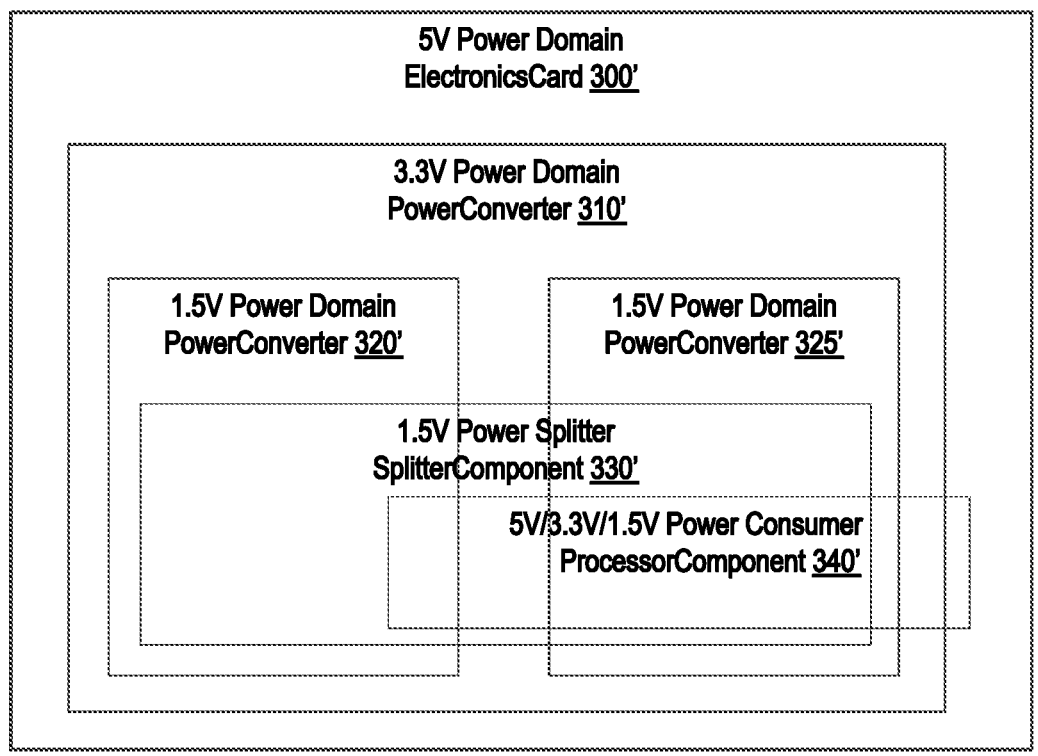

Specifically, FIG. 4A (or FIG. 4B) shows that a 3.3V power domain (having a PowerConverter 310') draws power from a 5V power domain (i.e., an ElectronicsCard 300'); that two 1.5V power domains (having PowerConverters 320', 325') draws power from the 3.3V power domain; that a 1.5V power splitter (having a SplitterComponent 330') draws power from multiple 1.5V power domains to a single 1.5V power domain; that a 5V/3.3V/1.5V power domain (having a ProcessorComponent 340') draws power from the 5V power domain, the 3.3V power domain and the accumulated 1.5V power domains. The physical power connections among all power domain within ElectronicsCard model 300 are also shown in the power flow diagram of FIG. 4A.

Figure 5:
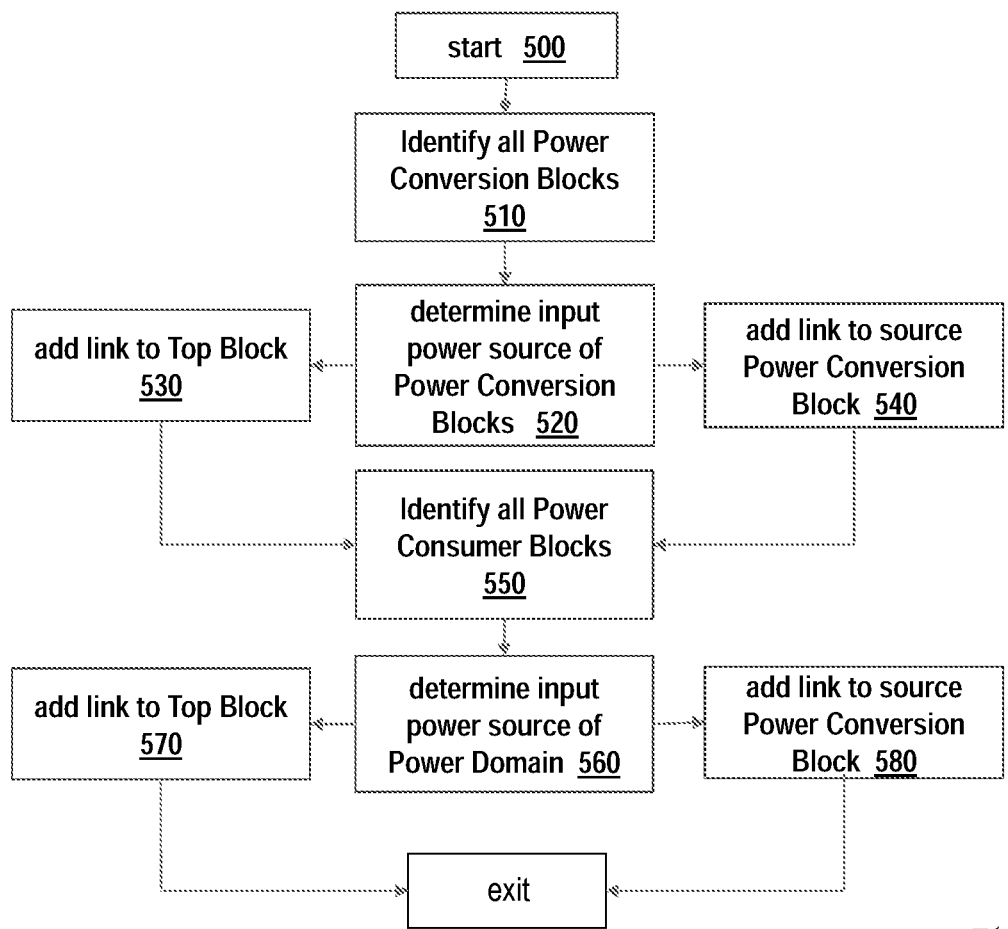
FIG. 5 is a logic flow diagram of a method for converting a system architecture of an electronic system to a power flow architecture of the electronic system.

Referring now to FIG. 5, there is depicted a flow diagram of a method for converting the system architecture (such as FIG. 3) of the electronic system design to the power flow architecture (such as FIG. 4A) of the electronic system design (i.e., block 220 in FIG. 2), according to one embodiment. Starting at block 500, all power conversion blocks in the system architecture (such as blocks 310 and 320 in FIG. 3) are identified, as shown in block 510. For each of the identified Power Conversion Blocks, determine the input power source of Power Conversion Block, as depicted in block 520. If the Power Conversion Block's input power is the primary input source to Top Block (such as block 305), add a hierarchical link from the Power Conversion Block to Top Block, as shown in block 530. If the Power Conversion Block's input power comes from another Power Conversion Block, add a hierarchical link from the Power Conversion Block to that another Power Conversion Block, as depicted in block 540.

Next, identify all Power Consumer Blocks (such as block 340 in the system architecture in FIG. 3), as shown in block 550. For each of the identified Power Consumer Blocks, Power Domain's input power source is determined for each Power Domain (from which the Power Consumer Block consumes power), as depicted in block 560. If Power Domain's input power is a primary input source to Top Block, add a hierarchical link to Top Block, as shown in block 570. If Power Domain's input power is created by a Power Conversion Block, add a hierarchical link to the source Power Conversion Block, as depicted in block 580. For all newly added hierarchical links in the power flow architecture, if the same hierarchical link is present in the system architecture, an existing hierarchical link can be used. If the hierarchical link is new, a SysML Aggregation link will be used.

In addition, a Power Analysis Library is developed. The Power Analysis Library starts with the base block of PowerItem. PowerItem has the basic properties required for any system block that consumes power. A set of voltage domain blocks, such as Power5VItem, Power3.3VItem, etc, is derived from PowerItem. The voltage domain blocks are customized for specific voltage domains.

The Power Analysis Library includes PowerItems, PowerSplitItems, and PowerConversionItems. PowerItems are created for each Power Domain required for the given System Architecture and are used to represent where a block consumes power in a given Power Domain, such as PowerItem5V, PowerItem3.3V, PowerItem1.5V in the current example.

PowerConversionItems are created for each Power Domain conversion required for a given system architecture, they can be unique for different methods of power conversion, such as Linear and Switching conversion methods, which are PowerLinear3.3Vdownto1.5VItem and PowerSwitch5Vdownto3.3VItem in the current example.

A set of Power Conversion Blocks can be derived from PowerItem. The power conversion blocks have constraints that automatically calculate conversion efficiencies based on child calculations to generate a very accurate analysis of the system power. A constraint, in SysML language term, is for calculation or algorithm. Each SysML Block has the capability of having one or more constraints that may perform calculations during parametric roll-ups (in block 250 of FIG. 2).

PowerSplitterItems are virtual blocks created for dividing the power draw from a large power consumer across multiple power sources or power converters for a given system architecture, they can be tailored for balanced and unbalanced distribution of power, which are PowerSplitter1.5Item in the current example.

Subsequently, each Power Domain Block within the power flow architecture is designated a power domain type, as shown in block 230. For example, each SysML block in the power flow architecture of ElectronicsCard 300' is assigned one or more power domains or power conversion types. ElectronicsCard 300' is of type Power5VItem to represent a single 5V power input to ElectronicsCard 300'. ProcessorComponent 340' is of types Power5VItem, Power3.3VItem and Power1.5VItem because it consumes power in each of the above-mention three power domains. PowerConverter 310' is of type PowerSwitch5Vdownto3.3VItem that converts the primary input power of 5V to 3.3V. PowerConverter 320' and 325' are of type PowerLinear3.3Vdownto1.5VItem that converts the on-card generated 3.3V to 1.5V for the ProcessorComponent 340'. PowerSplitter 330' is of type PowerSplitter1.5VItem that distributes the 1.5V current draw from ProcessorComponent 340' across PowerConverters 320' and 325'.

ProcessorComponent 340' shows the concept of multiple-inheritance. ProcessorComponent 340' inherits the properties and capabilities of multiple power domain items without the need to create a new base item that supports only these three power domains. There is a tremendous advantage of only assigning the required power domain types to each block. This is because the field of power analysis generally deals with dozens of power domains. If the properties and constraint algorithms for each possible power domain were to be carried for all blocks in the system, this would create significant overhead in the simulator. By creating power domain base types for each individual power domain, a power designer can pick and choose which domains are needed for each block.

Figure 6:
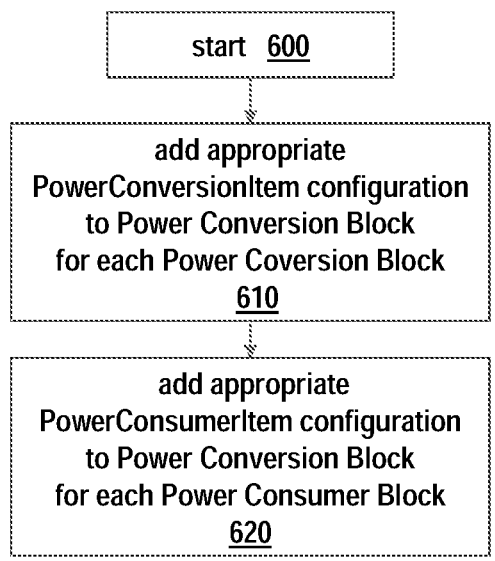
FIG. 6 is a logic flow diagram of a method for designating Power Domain Types.

With reference now to FIG. 6, there is depicted a flow diagram of a method for designating Power Domain Types (i.e., block 230 in FIG. 2), according to one embodiment. Starting at block 600, for each Power Conversion Block, an appropriate PowerConversionItem configuration from the Power Analysis Library is added as a Base Classifier to the Power Conversion Block, as shown in block 610. Next, for each Power Consumer Block, an appropriate PowerConsumerItem configuration from the Power Analysis Library is added as a Base Classifier to the Power Conversion Block, for each Power Domain (where the Power Consumer Block consumes power), as depicted in block 620. Multiple Base Classifiers are allowed for blocks that consume power in multiple power domains, e.g., both 5V and 3.3V.

Power information are then added to the power flow architecture of the electronic system, as depicted in block 240 of FIG. 2. For example, since ProcessorComponent 340' in ElectronicsCard 300' consumes power in three power domains, ProcessorComponent 340' requires a power value for each domain. These power values are called valueProperties in SysML. In the present example, only ProcessorComponent 340' is a direct consumer of power and therefore requires power information valueProperties. In other systems, there would be many blocks that are consumers of power, and all those blocks will require base power information.

Figure 7:
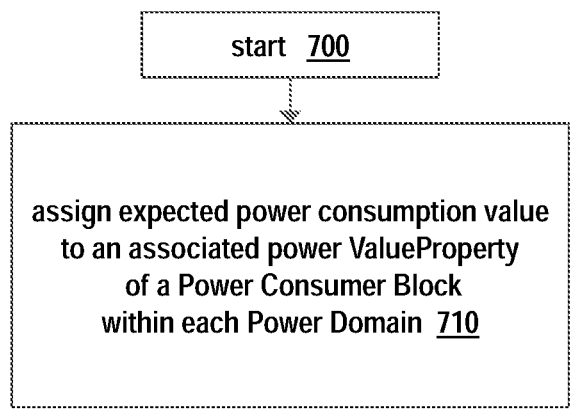
FIG. 7 is a logic flow diagram of a method for adding Power Information.

Referring now to FIG. 7, there is depicted a flow diagram of a method for adding Power Information (i.e., block 240 in FIG. 2), according to one embodiment. Starting at block 700, for each Power Consumer Block, an expected power consumption value is assigned to an associated power ValueProperty in each Power Domain (from which the Power Consumer Block consumes power), as shown in block 710. For example, if a Power Consumer Block consumes 1W of power in the 5V Power Domain, itemPower5V is set to "1."

ItemPower ValueProperties can also be derived from other block ValueProperties. For example, a "frequency" ValueProperty can be specified for the ProcessorComponent block. A Constraint of SysML can then calculate the expected consumed power from the given frequency ValueProperty and set all required itemPower ValueProperties automatically.

BalanceRatio ValueProperties can be assigned for PowerSplitter blocks to create balanced and unbalanced distribution of the power through the power architecture, providing for additional accuracy in the evaluation of the proposed system architecture.

Finally, a parametric power roll-up calculation is performed to analyze the full power of the power flow architecture of the electronic system in order to yield a final system power value of the power flow architecture of the electronic system, as shown in block 250 of FIG. 2. A parametric power roll-up calculation is a sequence of calculations that starts at one or more child nodes of a power flow architecture. Calculations are first started at the child node(s), and the results are sent to its/their parent node. Another calculation is then performed by each of the parent nodes, and the results are passed to each of their parent's node. This sequence continues until the top parent node is reached, and the final calculation is performed. The calculated value includes all power domain conversion inefficiencies as programmed by the power conversion models.

As has been described, the present disclosure provides an improved method and apparatus for providing system power estimations. This new methodology allows power information for the architected systems to be embedded into a common and reusable database. If multiple systems use a common base element, that base element only needs its power information to be configured once. This provides a single source of true information for base elements and components in the database.

After the above-mentioned ElectronicsCard model has been developed, if a new system named ElectronicsCard2 needs to be developed, which also includes ProcessorComponent, it is not required to perform any redundant effort to provide power information for ProcessorComponent, because ProccesorComponent is already present in the database and can be reference by any model that requires this component. In a period of time, the database will continue to grow to include many of the standard base components being used in the system architectures. As a result, there will be an improvement in architecture development timeline and be able to use this immediate power analysis feedback to identify optimal power solutions.

A comprehensive set of SysML block specifications and constraints that allow for the automated power analysis of architected systems is generated. The methodology leverages the SysML language's capability of multiple-inheritance to enable an al-a-carte style of applying power domains to architected system blocks. The architected system blocks are then linked in a hierarchical fashion starting with child nodes (or PowerConsumers) that may contain one or more power domains, through conversion nodes (or PowerConverters) that translate from one power domain to another, to a final parent node (or PowerSystem) that represents the total system power.

While the invention has been particularly shown and described with reference to a preferred embodiment, it will be understood by those skilled in the art that various changes in form and detail may be made therein without departing from the spirit and scope of the invention.

What is claimed is:

1. A method for providing a power estimation for an electronic system design, said method comprising:
   converting a system architecture of an electronic system design to a power flow architecture of said electronic system design;
   designating a Power Domain Type for each Power Domain within said power flow architecture of said electronic system design;
   adding power information to said power flow architecture of said electronic system design; and
   performing a power roll-up calculation on said power flow architecture of said electronic system design to yield a final system power value for said electronic system design.

2. The method of claim 1, wherein said converting further includes
   identifying all Power Conversion Blocks;
   identifying all PowerSplitter Blocks; and
   identifying all Power Consumer Blocks.

3. The method of claim 2, wherein said identifying Power Conversion Blocks further includes
   determining an input power source of a Power Conversion Block; and
   adding a link to one of said input power source of said Power Consumer Block and a Top Block.

4. The method of claim 2, wherein said identifying Power Consumer Blocks further includes
   determining an input power source of a Power Domain Block; and
   adding a link to one of said input power sources of said Power Domain Block and a Top Block.

5. The method of claim 1, wherein said designating further includes
   adding an appropriate PowerConversionItem configuration from a Power Analysis Library as a Base Classifier to a Power Conversion Block, for each Power Conversion Block; and
   adding an appropriate PowerConsumerItem configuration from said Power Analysis Library as a Base Classifier to said Power Conversion Block, for each Power Domain from which said Power Consumer Block consumes power.

6. The method of claim 1, wherein said adding further includes assigning an predetermined power consumption value to an associated power ValueProperty of a Power Consumer Block within said each Power Domain from which said Power Consumer Block consumes power.

7. An apparatus comprising:
   a memory; and
   at least one processor for
      converting a system architecture of an electronic system design to a power flow architecture of said electronic system design;
      designating a Power Domain Type for each Power Domain within said power flow architecture of said electronic system design;
      adding power information to said power flow architecture of said electronic system design; and
      performing a power roll-up calculation on said power flow architecture of said electronic system design to yield a final system power value for said electronic system design.

8. The apparatus of claim 7, wherein said converting further includes
   identifying all Power Conversion Blocks;
   identifying all PowerSplitter Blocks; and
   identifying all Power Consumer Blocks.

9. The apparatus of claim 8, wherein said identifying Power Conversion Blocks further includes
   determining an input power source of a Power Conversion Block; and
   adding a link to one of said input power source of said Power Consumer Block and a Top Block.

10. The apparatus of claim 8, wherein said identifying Power Consumer Blocks further includes
    determining an input power source of a Power Domain Block; and
    adding a link to one of said input power source of said Power Domain Block and a Top Block.

11. The apparatus of claim 7, wherein said designating further includes
    adding an appropriate PowerConversionItem configuration from a Power Analysis Library as a Base Classifier to a Power Conversion Block, for each Power Conversion Block; and
    adding an appropriate PowerConsumerItem configuration from said Power Analysis Library as a Base Classifier to said Power Conversion Block, for each Power Domain from which said Power Consumer Block consumes power.

12. The apparatus of claim 7, wherein said adding further includes assigning an predetermined power consumption value to an associated power ValueProperty of a Power Consumer Block within said each Power Domain from which said Power Consumer Block consumes power.

* * * * *